No. 740,416. PATENTED OCT. 6, 1903.
V. GEBHARDT.
BAIT HOLDER.
APPLICATION FILED DEC. 23, 1902.
NO MODEL.

Witnesses
C. M. Catlin

Inventor
Victor Gebhardt
By J. W. Tallmadge
Attorney

THE NORRIS PETERS CO., PHOTO-LITHO., WASHINGTON, D. C.

No. 740,416. Patented October 6, 1903.

UNITED STATES PATENT OFFICE.

VICTOR GEBHARDT, OF ST. LOUIS, MISSOURI.

BAIT-HOLDER.

SPECIFICATION forming part of Letters Patent No. 740,416, dated October 6, 1903.

Application filed December 23, 1902. Serial No. 136,333. (No model.)

*To all whom it may concern:*

Be it known that I, VICTOR GEBHARDT, a citizen of the United States, residing at St. Louis, in the State of Missouri, have invented new and useful Improvements in Bait-Holders, of which the following is a specification.

The invention relates to bait-holder attachments for fish-hooks, and has for its object to simplify and cheapen the construction and increase the efficiency of such devices.

The invention consists in the construction hereinafter described and pointed out.

Figure 1:
Figure 2:
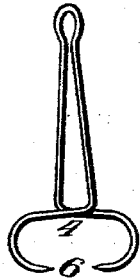
Figure 3:
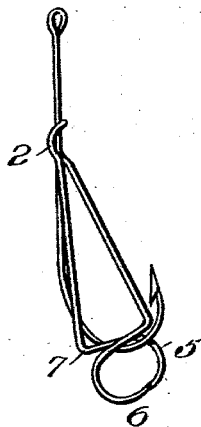
Figure 4:
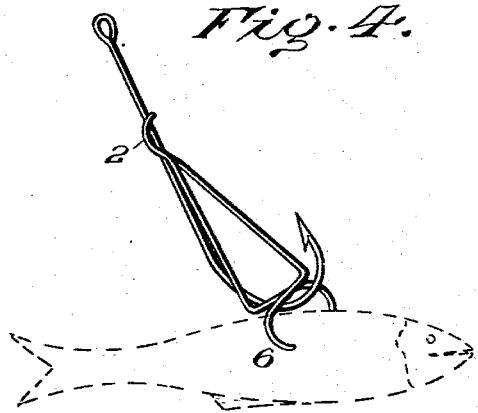

In the accompanying drawings, Figure 1 is an elevation of the attachment. Fig. 2 is a like view of the same expanded as in connecting the attachment to a minnow. Fig. 3 is an elevation of a hook and the attachment connected. Fig. 4 is a like view showing a minnow held by the attachment.

My hook attachment for holding live bait, and particularly small fish, is made of a single wire bent at or near the middle to form a loop 1, having a small transverse bend 2 and adapted to clasp the hook oppositely at two or more points, as indicated in Figs. 3 and 4. Each member of the loop extends outwardly therefrom at a small angle and at 3 is bent to cross the other member, as indicated at 4, and in then bent into an approximately semicircular form, producing thereby a ring 5, comprising wire ends 6, normally held contiguous or slightly overlapping each other. A slight pressure on the shoulder 7 of the attachment opens the ring, as indicated in Fig. 2. The minnow can then be placed in the opened ring and held by the wire ends pressed toward each other by the elasticity of the parts.

It is not essential that the split ring 5 be circular nor that in use it shall clasp any particular part of the minnow, though the preferred method is illustrated.

It is not necessary in all cases that the ends of the split ring be sharp or even pointed, and any form that will securely clasp the minnow may be used.

This holder injures the bait much less than impalement on a hook and leaves it more freedom of action.

This attachment can be applied to hooks of various sizes and of different forms and can be variously adjusted on the same hook.

I am aware that a bait-holder has been fixed to a hook-shank and that in another case a holder has been fixed to the curved part of the hook, and such devices are not broadly claimed herein. My improvement is characterized by the double connection of the attachment to the hook-shank to prevent lateral swinging and provide a secure but detachable hold. It may also be supported by its bait-clasping ring, having its upper part situated above the curved part of the hook. the several connections being such that the attachment can be sprung on the hook and be detachably supported thereon both at its upper and lower ends, whereby it is held securely notwithstanding its detachability, both the hook and the bait-holding split ring acting to prevent independent sidewise movement, the construction being such that the seizure of the bait held in the ring may carry it toward the hook-point by lifting the lower end of the attachment, which effect is permitted by the character of the attachment and the nature of its connection to the hook-shank.

A minnow has been herein described and illustrated as a bait; but obviously the improvement is not limited to the particular kind of bait, as any bait desired may be used with the holder and hook.

Having described my invention, what I claim as new, and desire to secure by Letters Patent, is—

1. The hook attachment for holding bait comprising the loop with bends 2 whereby it engages the hook-shank at two opposite points, the side members provided with shoulders and overlapped and bent to form a split ring to hold the bait, said overlapped members forming the upper side of the ring above the curved part of the hook approximately midway the barb and shank.

2. A hook attachment for holding bait loosely connected to the hook-shank by a loop opening toward the barb, a split bait-holding ring having its upper side above the curved part of the hook approximately midway the barb and shank, and compressible side members connecting the ring and loop.

In testimony whereof I have signed my name to this specification in the presence of two subscribing witnesses.

VICTOR GEBHARDT.

Witnesses:
OTTO J. KRIEG,
RICHARD L. GEBHARDT.